(No Model.)
W. A. WOOD.
HARVESTER REEL.
No. 294,103. Patented Feb. 26, 1884.
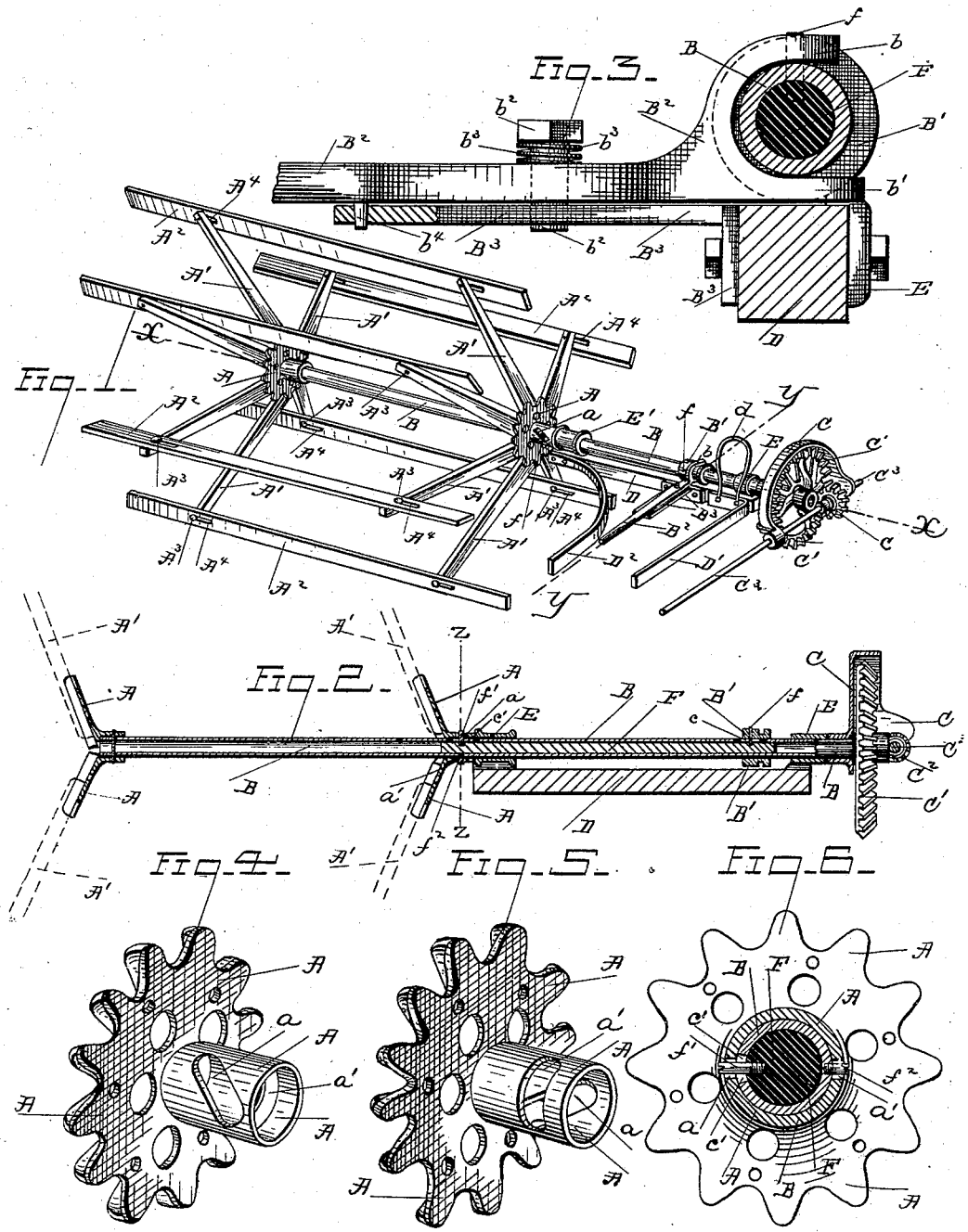
WITNESSES:
W. B. Masson
John E. Wilcox
INVENTOR:
Walter A. Wood
By J. Russell Parsons
Attorney

UNITED STATES PATENT OFFICE.

WALTER A. WOOD, OF HOOSICK FALLS, NEW YORK.

HARVESTER-REEL.

SPECIFICATION forming part of Letters Patent No. 294,103, dated February 26, 1884.

Application filed August 25, 1883. (No model.)

*To all whom it may concern:*

Be it known that I, WALTER A. WOOD, of the village of Hoosick Falls, county of Rensselaer, and State of New York, have invented certain new and useful Improvements in Harvester-Reels; and I do declare the following to be a full, clear, and exact description of the same, reference being had to the accompanying drawings, making a part of this specification, in which—

Figure 1 represents the reel complete, with its support and driving-gear in perspective. Fig. 2 represents a cross-section of the reel-shaft and the plank on which it is supported, on the line $x\ x$, Fig. 1, with the bevel-gear in elevation. Fig. 3 represents the lever and its connections by which the device is operated, partly in elevation and partly in section on the line $y\ y$, Fig. 1. Figs. 4, 5, and 6 represent the heads which support the reel-arms, 4 and 5 in perspective, and 6 in cross-section on line $z\ z$, Fig. 2. Fig. 7 represents the plate which supports the lever and on which it works.

Similar letters of reference denote the same parts in the several figures.

The object of this invention is to simplify the mechanism used heretofore by which the operator, in his seat on the machine, can control the position of the beaters or reel-blades, so they may strike into the grain and revolve in a path parallel to the cutters, or may be inclined, so that either end may strike in and revolve in advance of the other end thereof.

I am aware that reels for harvesters have been made with their beaters or blades set spirally and adjustably to the reel-shaft, and thus act on the grain, in the manner as shown, at one end.

My invention consists in the means used to secure the operating-lever in different positions at the will of the operator in his seat, whether the machine is at rest or is in operation.

The shaft B supports the arms and blades or beaters of the reel, and takes motion from the bevel-wheel C', or any other well-known means from the machinery of the harvester.

A A are annular heads which slip on the shaft B. The outer one, or the one toward the standing grain, is fast to the shaft B, being pinned thereto. The inner one is loose on the shaft, and can turn within certain limits on the shaft B, as will be more fully hereinafter described. These heads are made with flanges or recesses to receive the reel-arms A'. These reel-arms support the reel paddles or blades $A^2$. These heads are made so that the recesses to receive the arms A' will stand in an oblique direction to the shaft B. The shaft B is made hollow, of gas-pipe or other suitable material, and is supported in bearings E E', which are bolted to the support D, which sustains the reel, by means of the supports D' and $D^2$, which are so arranged that the driver can adjust the reel either upward or downward or forward and back by a lever in the usual well-known way.

Within the hollow shaft B is placed another shaft, F, which turns with the shaft B. The inner head, A, or the one next the driving-wheel side of the machine, is fitted loosely on the shaft B, as before stated, and the hub of this head is provided with a diagonal slot, $a$, on one side of its hub, and a pin, $f'$, is rigidly fastened to the interior shaft, F. The pin $f'$ extends through the slot $a$, and also through a slot cut lengthwise in the hollow shaft B.

On the side of the hub A aforesaid, and opposite the slot $a$, is another slot, $a'$, which is vertical instead of oblique, which receives a pin, $f^2$, which is fast to the hollow reel-shaft B. An iron plate, $B^3$, is bolted fast to the piece D by two bolts in its forward flange, as shown in Fig. 7. On top of this plate is pivoted a lever, $B^2$, by a bolt, $b^2$. Underneath the head of the bolt is a coiled spring, $b^3$, and toward the rear of the plate $B^3$ are holes which receive a pin or projection, $b^4$, on the under side of the lever, the coiled spring keeping it in place. The forward end of this lever $B^2$ is bifurcated and made to clasp a flanged ring, B', which is pinned fast to the interior shaft, F. The ring B' can slide a sufficient distance on shaft B, a slot being cut in shaft B, sufficient to allow the pin to pass through it. The end of the lever $B^2$ is in convenient distance to the operator in his seat.

The operation of the machine is as follows: When it is desired to have the reel blades or paddles enter the grain parallel to the cutters, the lever $B^2$ is left with its projection $b^4$ in the center hole, $b^6$. If it is required to make one end of the blades strike first, the operator moves the lever and sets it in one of the holes on either side of the center hole, as he may desire to make either end of the blades strike in first. Only three holes are shown in the drawings; but it is plain that more may be used, in order to give a greater scope to the change of position of the reel blades or beaters. When the lever is moved, the interior shaft is slid endwise within the shaft B, and the pin $f'$, acting against the incline surface of the slot $a$, twists or turns the inner head, A, on the hollow shaft B, the pin $f^2$ preventing the head from sliding lengthwise of the shaft B. This causes the blades or beaters to be inclined either way, according to the direction in which the lever $B^2$ is moved. The beaters, if rigidly bolted to the arms, will offer resistance to this movement. To provide for this, I attach the beaters by a swivel or pivoted joint in any well-known way.

Having thus fully described my invention, what I claim therein as new, and desire to secure by Letters Patent, is—

The combination of the reel-support D, the tubular reel-shaft B, and internal shaft, F, the lever-supporting plate $B^3$, secured to the reel-support, and provided with perforations $b^5$ $b^6$ $b^7$, the pivot-bolt $b^2$, and spring $b^3$, with the bifurcated lever $B^2$, having a pin, $b^4$, on the under side thereof, substantially as and for the purpose described.

WALTER A. WOOD.

Witnesses:
J. RUSSELL PARSONS,
A. C. GEER.